US006274201B1

(12) United States Patent
Borom et al.

(10) Patent No.: US 6,274,201 B1
(45) Date of Patent: Aug. 14, 2001

(54) PROTECTIVE COATINGS FOR METAL-BASED SUBSTRATES, AND RELATED PROCESSES

(75) Inventors: Marcus Preston Borom, Schenectady; Dennis Michael Gray, Delanson; Yuk-Chiu Lau, Ballston Lake; Surinder Singh Pabla, Rexford, all of NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/558,258

(22) Filed: Apr. 25, 2000

Related U.S. Application Data

(62) Division of application No. 09/385,544, filed on Aug. 30, 1999, now Pat. No. 6,165,628.
(51) Int. Cl.[7] .................... C23C 4/04; C23C 4/10
(52) U.S. Cl. .......................... 427/454; 427/456
(58) Field of Search ......................... 427/454, 456, 427/419.2, 419.3

(56) References Cited

U.S. PATENT DOCUMENTS

| 4,116,723 | | 9/1978 | Gell et al. . | |
|---|---|---|---|---|
| 4,741,286 | | 5/1988 | Itoh et al. . | |
| 5,047,612 | | 9/1991 | Savkar et al. . | |
| 5,236,745 | * | 8/1993 | Gupta et al. | 427/454 |
| 5,320,909 | * | 6/1994 | Scharman et al. | 428/472 |
| 5,332,598 | | 7/1994 | Kawasaki et al. . | |
| 5,399,313 | | 3/1995 | Ross et al. . | |
| 5,403,669 | * | 4/1995 | Gupta et al. | 428/550 |
| 5,508,097 | | 4/1996 | Hauser et al. . | |
| 5,527,591 | | 6/1996 | Ceretzer et al. . | |
| 5,763,107 | * | 6/1998 | Rickerby et al. | 428/623 |
| 5,912,087 | * | 6/1999 | Jackson et al. | 428/610 |
| 5,942,337 | * | 8/1999 | Rickerby et al. | 428/623 |
| 5,981,091 | * | 11/1999 | Rickerby et al. | 428/670 |

* cited by examiner

*Primary Examiner*—Deborah Jones
*Assistant Examiner*—Bryant Young
(74) *Attorney, Agent, or Firm*—Donald S. Ingraham; Douglas E. Stoner

(57) ABSTRACT

An article is described, which includes a metal-based substrate, such as a superalloy; a dense, primary bond layer; and a spongy secondary bond layer. A thermal barrier coating is applied over the secondary bond layer. The spongy layer has a microstructure which includes an open network of interconnected pores. A process is also described. It includes the step of applying a spongy, metallic bond layer over the substrate, followed by the application of a thermal barrier coating. A dense, primary bond layer may optionally be applied before the application of the spongy layer.

8 Claims, 3 Drawing Sheets

(SAMPLE A)

(SAMPLE B)

(SAMPLE C)

(SAMPLE D)

*COMPARATIVE EXAMPLE

PROTECTIVE COATINGS FOR METAL-BASED SUBSTRATES, AND RELATED PROCESSES

This application is a division of application Ser. No. 09/385,544, filed Aug. 30, 1999, which is hereby incorporated by reference in its entirety.

BACKGROUND OF THE INVENTION

This invention relates generally to protective coatings applied to metals. More specifically, it is directed to a thermal barrier coating system for a metal substrate which is used in a high temperature environment.

Specially-formulated coatings are often used to protect metal parts which are exposed to high temperatures. Aircraft engines are made from such parts, as are land-based gas turbines. The combustion gas temperatures present in the turbine engine of an aircraft are maintained as high as possible for operating efficiency. Turbine blades and other elements of the engine are usually made of alloys which can resist the high temperature environment, e.g., superalloys, which have an operating temperature limit of about 1000° C.–1150° C. Operation above these temperatures may cause the various turbine elements to fail and damage the engine.

The protective coatings, often referred to as thermal barrier coatings or "TBC"s, effectively increase the operating temperature of the turbine engine by maintaining or reducing the surface temperature of the alloys used to form the various engine components. Most TBC's are ceramic-based, e.g., based on a material like zirconia (zirconium oxide), which is usually chemically stabilized with another material such as yttria. For a jet engine, the coatings are applied to various surfaces, such as turbine blades and vanes, combustor liners, and combustor nozzles.

Usually, the TBC ceramics are applied to an intervening bond layer ("bond coat") which has been applied directly to the surface of the metal part. The bond layer is often critical for improving the adhesion between the metal substrate and the TBC. Bond layers are typically formed from a material like "MCrAlY", where "M" represents a metal like iron, nickel, or cobalt. The bond layer may be applied by a variety of conventional techniques, such as PVD; plasma spray, or other thermal spray deposition methods such as HVOF (high velocity oxy-fuel). In the past, those skilled in the protective coating arts have generally concluded that the bond layers should be as dense and rough as possible. However, the deposition processes still undesirably resulted in coatings which were not dense, i.e., which could be characterized as "spongy".

The effectiveness of a TBC coating is often measured by the number of thermal cycles it can withstand before it delaminates from the substrate which it is protecting. In general, coating effectiveness decreases as the exposure temperature is increased. The failure of a TBC is often attributed to weaknesses or defects related in some way to the bond coat, e.g., the microstructure of the bond coat, or deficiencies at the bond coat-substrate interface or the bond coat-TBC interface.

It should be apparent from this discussion that new protective coating systems of increased quality are very desirable—especially for high performance applications, such as superalloy parts exposed to high temperatures and frequent thermal cycles. In addition to maintaining their integrity over a large number of thermal cycles, the coating systems should be compatible with conventional application equipment, e.g., various plasma spray techniques.

SUMMARY OF THE INVENTION

This invention is based on the discovery of new coatings which satisfy the needs discussed above. In one aspect, this invention embraces an article, comprising:

(i) a metal-based substrate, such as a superalloy;

(ii) a dense, primary bond layer over the substrate;

(iii) a secondary bond layer over the dense layer, having a microstructure which comprises an open network of interconnected pores; and (iv) a thermal barrier coating over the secondary bond layer.

The dense, primary bond layer is often applied by a vacuum plasma spray technique or by a high velocity oxy-fuel (HVOF) technique. The secondary bond layer is usually applied by a plasma spray process, although alternative techniques may be used.

As described below, the secondary bond layer has a spongy structure. This bond layer is usually formed by plasma-spraying particles of the bond layer material, wherein the particles usually have a specified size range. The microstructure of the bond layer has at least about 225 continuous strings of oxide greater than 25 microns in length, per square millimeter of sample, viewed in cross-section.

Another aspect of the invention relates to a method for providing a protective coating on a metal-based substrate. The method comprises the steps of:

(a) applying a metallic bond layer over the substrate, wherein the bond layer has a microstructure which comprises an open network of interconnected pores; and then (b) applying a thermal barrier coating over the bond layer.

In some instances, a dense, primary bond layer is applied over the substrate before the application of the metallic bond layer in step (a), as described previously.

Other details regarding the various embodiments of this invention are provided below.

DETAILED DESCRIPTION OF THE INVENTION

Figure 1:
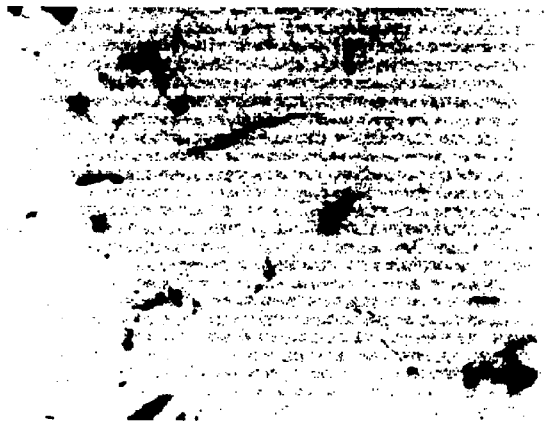
FIG. 1 is a photomicrograph of a cross-section of a metallic bond coat applied on a superalloy substrate, using a vacuum plasma technique.

A variety of materials can be used for the metal-based substrate of this invention. The substrate can be any metallic material or alloy which is typically protected by a thermal barrier coating. Often, the substrate is a heat-resistant alloy, e.g., a superalloy. Such materials are described in various references, such as U.S. Pat. Nos. 5,399,313 and 4,116,723, both incorporated herein by reference. High temperature alloys are also generally described in Kirk-Othmer's *Encyclopedia of Chemical Technology*, 3rd Edition, Vol. 12, pp. 417–479 (1980); and Vol. 15, pp. 787–800 (1981). Illustrative nickel-base alloys are designated by the trade names Inconel®, Nimonic®, Rene® (e.g., Rene 80-, Rene 95 alloys), and Udimet®. As mentioned above, the type of substrate can vary widely, but it is often in the form of a turbine engine part, such as a combustor liner. As another example, the substrate may be the piston head of a diesel engine, as well as any other surface requiring a heat-resistant barrier coating.

The article of this invention includes a dense, primary bond layer (component ii) applied over the substrate. (The meaning of "density" as used herein is provided by the parameters set forth below). The primary bond layer is especially useful for protecting the substrate in environments in which the TBC may be exposed to damaging conditions, e.g., excessive oxidation. In those cases, the dense layer will provide additional environmental protection if the TBC were to erode or be chipped away. The dense, primary bond layer is usually formed of an MCrAlY material, where "M" can be various metals or combinations of metals, such as Fe, Ni, or Co. These alloys often have a broad composition (in weight percent) of about 17% to about 23% chromium; about 4% to about 13% aluminum; and about 0.1% to about 2% yttrium; with M constituting the balance. In some preferred embodiments, M is a mixture of nickel and cobalt, wherein the ratio of nickel to cobalt is in the range of about 10:90 to about 90:10, by weight.

In contrast to the secondary bond layer of component (iii) (which will be described below), the dense layer has a relatively low level of entrained oxide in its microstructure, and may be substantially free of entrained oxide. The dense layer also has a relatively small number of the interconnected pores or "oxide strings" found in component (iii), i.e., less than about 200 oxide strings. Usually (but not always), the dense bond layer also has an oxide inclusion level of less than about 10%, by volume. In some embodiments, the oxide inclusion level for the dense bond layer is less than about 5%, by volume.

The dense, primary bond layer may be applied to the substrate by various techniques, such as a vacuum plasma spray technique or an HVOF technique. Vacuum plasma systems are known in the art. They are often powered by direct current, and the process is carried out in a low-pressure environment, e.g., at about 20 torr to about 60 torr, with greatly reduced levels of oxygen. These parameters minimize the level of oxide inclusion, because there is much less oxygen available for accumulation onto the molten coating particles.

A conventional vacuum plasma spray gun can be used, e.g., an EPI 03CA gun from Electroplasma (Sulzer-METCO, Inc.). Such a gun is usually operated at a power level in the range of about 70–80 kw, although the range can vary. The primary gas is usually argon or nitrogen, while the optional secondary gas is usually helium or hydrogen. The carrier gas can also be nitrogen or argon, for example. Those of ordinary skill in the art are familiar with the various factors which relate to the selection of a gas, e.g., coating material; the ionization energy of the gas; cost factors, and equipment requirements. Other factors can also be considered by those familiar with this technology, e.g., factors such as the most appropriate flow rates for the gasses, and the effects of altering flow rates. As a non-limiting illustration, the following regimen is provided:

Primary gas: argon, at about 160 to 300 scfh.
Secondary gas: helium, at a flow rate up to about 120 scfh;
Carrier gas: nitrogen or argon, at a flow rate of about 8 to about 35 scfh.

The atmospheric (tank) pressure for the vacuum plasma spray system can be as high as about 300 torr, but is usually in the range of about 20 torr to about 150 torr. The powder feed rate usually ranges from about 5 to about 60 pounds per hour, while the powder particle size is usually in the range of about 5 to about 40 microns (average diameter). The spray speed usually ranges from about 12 to about 75 meters per minute.

HVOF techniques which may be used to apply the dense layer are also known in the art and described, for example, in U.S. Pat. Nos. 5,508,097 and 5,527,591, both incorporated herein by reference. HVOF is a continuous combustion process in which the powder is injected into the jet stream of a spray gun at very high speeds, e.g., at least about 500 meters per second. An illustration of the use of HVOF to deposit the dense layer is provided in Example 1.

The thickness of the dense, primary bond layer will depend in part on the conditions to which the coated article will be subjected, as well as other factors, such as the level of oxidation protection required for the article. Usually, the thickness will be in the range of about 100 microns to about 400 microns, and preferably, in the range of about 200 microns to about 300 microns.

The secondary bond layer of the present invention is used in part to promote adhesion between the primary bond layer and the subsequently-applied thermal barrier coating. It also acts as a strain-reliever between the other two layers. Some of the preferred bond coatings for this invention have the formula MCrAlY, as described previously.

The microstructure of the secondary bond layer comprises an open network of interconnected pores. The pores are generally located between layers of oxide which are entrained on particles of the bond layer material. During a plasma spray process, oxide-coated particles of the bond layer material generally do not bond to other oxide-coated particles, nor do they bond to metal particles. Thus, as bond layer particles are deposited on top of one another as the coating is built up, the space formed between the non-bonding surfaces becomes the network of pores. This microstructure (which could be described as "spongy") is in direct contrast to the dense bond layers which were thought to be desirable in the prior art. The microstructure of a dense coating has a relatively low level of entrained oxide on the particles of coating material. In that instance, there would not be an open network of interconnected pores.

The bond layer microstructure may be characterized by "line length", i.e., the sum of the strings of entrained oxide (i.e., lengths of porosity) in a given section of the coating. Such a measurement can be obtained by an image analysis of the section, using, for example, an optical microscope. As used herein, the term "string of oxide" is meant to exclude features which have closed porosity. No entrained oxide is present in those types of features, and the "strings" are generally not elongated or interconnected, as in the case of the desired microstructure. As shown in the examples which follow, the use of a vacuum plasma system would typically result in the formation of features having closed porosity, i.e., features which would not be suitable for the spongy, secondary bond layer of this invention.

In preferred embodiments, the microstructure of the spongy bond layer has at least about 225 continuous strings of oxide greater than 25 microns in length, per square millimeter of sample (viewed in cross-section), as measured by an optical microscope, 150× magnification. In some especially preferred embodiments, the bond layer microstructure will have at least about 300 continuous oxide strings greater than 25 microns in length. (In contrast, layer (ii), i.e., the dense primary bond layer, will have less than about 200 continuous strings of oxide greater than 25 microns in length, per square millimeter of sample).

In some cases, the extent of the network of interconnected pores in the microstructure for the secondary bond layer is related to the oxide inclusion level. (Oxide inclusion can be measured by image analysis, using an optical microscope equipped with a device for the computer-quantification of microstructural features). A higher oxide inclusion level can be indicative of a more extensive network. In preferred embodiments, the secondary bond layer is characterized by an oxide inclusion level of at least about 10% by volume. Frequently, the oxide inclusion level is between about 10% and about 45% by volume. It should be noted, however, that the line length parameter discussed above is the primary indication of whether the bond layer falls within the scope of the present invention.

The spongy, secondary bond layer is usually applied by a thermal spray technique, such as a plasma spray process. Various types of plasma-spray techniques may be utilized in the present invention. They are generally well-known in the art, e.g., see the Kirk-Othmer *Encyclopedia of Chemical Technology*, 3rd Edition, V. 15, page 255, and references noted therein. U.S. Pat. Nos. 5,332,598; 5,047,612; and 4,741,286 are instructive in regard to various aspects of plasma spraying, and are incorporated herein by reference. In general, the typical plasma spray techniques involve the formation of a high-temperature plasma, which produces a thermal plume. The coating material, in the form of a powder, is fed into the plume. The powder particles melt in the plasma and are accelerated toward the substrate being coated. (If the process is carried out in an air environment, it is often referred to as air plasma spray or "APS".)

Those of ordinary skill in the plasma spray coating art are familiar with various details which are relevant to applying the coating. Examples of the various steps and process parameters include: cleaning of the surface prior to deposition; grit blasting to remove oxides and roughen the surface; substrate temperature; and plasma spray parameters such as spray distances (gun-to-substrate); selection of the number of spray-passes; powder feed rate, torch power, plasma gas selection; oxidation control to adjust oxide stoichiometry; angle-of-deposition; post-treatment of the applied coating; and the like.

Special mention is made of several parameters which sometimes have an appreciable effect on coating quality. For example, torch power may vary in the range of about 10 kilowatts to about 200 kilowatts. Moreover, the bond layer coating particles should have an average size in the range of about 1 micron to about 100 microns, and preferably, in the range of about 5 microns to about 90 microns. As shown in the examples, air plasma-sprayed samples using bond layer material of different particle sizes resulted in microstructures having different appearances. However, the use of each particle size still resulted in microstructures falling within the parameters required for this invention, e.g., in terms of the number of continuous strings of oxide greater than 25 microns in length.

As mentioned above, the powder particles (which in most instances are substantially spherical in shape) melt in the plasma during the plasma spraying process. An entrained oxide layer forms on the particles during their flight toward the substrate. When the particles impact the surface of the substrate, they are often compressed somewhat, attaining a "pancake" shape. The oxide coating on some of the particles will typically crack, exposing the metallic material underneath. As additional particles hit the substrate surface, the coating is built up, resulting in a network of pores between the non-bonding surfaces.

Exemplary parameters for obtaining a spongy microstructure with the use of a typical air plasma spray system are provided here. In this illustration, a 40 kw plasma gun could be used, operating at a power level between about 30 kw and about 45 kw, and with a vertical injection of powder feed. (The plasma guns are commercially available from various sources, e.g., Sulzer-METCO, Inc.) The primary gas is usually nitrogen, argon, or helium. Nitrogen is often preferred, with a flow rate between about 80 scfh and about 160 scfh. The optional, secondary gas is usually hydrogen or helium. The flow rate for hydrogen is typically between about 10 scfh and about 160 scfh, while the flow rate for helium might range from about 20 scfh to about 60 scfh. (The secondary gas is used in some instances to increase the heat energy within the plasma). The carrier gas, which is usually nitrogen or argon, is usually fed into the system at a rate of from about 5 scfh to about 35 scfh.

In this illustration, the gun-to-substrate distance typically ranges from about 7 cm to about 15 cm. The gun speed across the substrate usually ranges from about 15 meters per minute to about 50 meters per minute. The powder feed rate will depend on various factors, such as powder composition and particle size, but typically ranges from about 1 pound (454 g) per hour to about 10 pounds (4.54 kg) per hour.

The parameters provided above are exemplary. Those of skill in the plasma deposition art can change those parameters without undue experimentation, to compensate for any changes made in gun power levels, powder composition, powder injection means; feed gas and carrier gas, and the like. As noted herein, adjustment of the parameters is carried out with the contemplated objective of achieving the spongy microstructure described above.

The thickness of the secondary bond layer will depend on various factors, such as the oxidation protection and corrosion protection desired for the component, as well as material costs. The shape and size of the part may also be considered, since the thickness of the bond layer should not exceed dimensional tolerances. A weight limit for the part may be an additional factor for consideration (especially in the case of an airfoil), since the bond coat will add some weight to the part. In general, the thickness will be in the range of about 50 microns to about 500 microns, and preferably, in the range of about 100 microns to about 400 microns. In especially preferred embodiments, the thickness will be in the range of about 200 microns to about 300 microns.

A zirconia-based thermal barrier coating is applied over the secondary bond layer of component (iii). In many preferred embodiments, a plasma spray technique is employed. As used herein, "zirconia-based" embraces ceramic materials which contain at least about 70% zirconia, by weight. Zirconia is a well-known compound for barrier coatings. Its use is described, for example, in Kirk-Othmer's *Encyclopedia of Chemical Technology*, 3rd Edition, V. 24, pp. 882–883 (1984). In preferred embodiments, the zirconia is chemically stabilized by being blended with a material such as yttrium oxide, calcium oxide, magnesium oxide, cerium oxide, scandium oxide, or mixtures of any of those materials. In one specific example, zirconia can be blended with about 1% by weight to about 20% by weight yttrium oxide (based on their combined weight), and preferably, from about 3%–10% yttrium oxide.

The plasma-spray techniques suitable for applying the TBC have been previously described herein, and in the various references. Again, those of ordinary skill in the art can selectively perform the routine preparation steps and adjust the various process parameters, e.g., surface pre-treatments; plasma spray distances; selection of spray distance and the number of spray-passes; gas temperature; powder feed rate; powder particle size and size distribution; heat treatment after deposition; oxidation control to control oxide stoichiometry; and the like. Various other factors will be considered, such as the particular composition of the zirconia-based TBC, and the end use of the part being coated. The thickness of the TBC will depend in part on the particular component being coated. Usually its thickness will be in the range of about 125 microns to about 2500 microns. In preferred embodiments for end uses such as airfoil components, the thickness is often in the range of about 250 microns to about 1150 microns.

It should be apparent from the foregoing description that another embodiment of this invention is directed to a method for providing a protective coating on a metal-based substrate, comprising the steps of:

(a) applying a spongy bond layer over the substrate, wherein the spongy layer has a microstructure which comprises an open network of interconnected porosity; and then (b) applying a thermal barrier coating over the spongy bond layer.

In some preferred embodiments, a dense primary bond layer can be applied over the substrate before the application of the spongy bond layer in step (a), as discussed previously.

The following examples are merely illustrative, and should not be construed to be any sort of limitation on the scope of the claimed invention.

EXAMPLE 1

In this example, coatings with different microstructures were prepared. For each sample, the substrate was a coupon made from a nickel-based superalloy. Prior to deposition of the bond coat, the coupons were grit-blasted and ultrasonically cleaned in a cleaning solution.

For sample A, an MCrAlY-type bond coat was employed, in which M was a combination of cobalt and nickel. The bond coat was deposited on the substrate by vacuum plasma spray (VPS), using an EPI gun from Electroplasma (Sulzer-METCO, Inc.), operating at about 80 kw. The primary gas was argon, with a flow rate of about 160–260 scfh. The secondary gas was helium, with a flow rate of about 40–80 scfh. The tank pressure was about 35 torr.

For sample B, the same bond coat material was deposited by a standard HVOF system, using a METCO DJ2600 HVOF gun. The oxidizing gas was oxygen, with a flow rate of about 350–550 scfh. The fuel gas was hydrogen, with a flow rate of about 1400–1800 scfh. A cooling gas was also used, with a flow rate of about 700–900 scfh. The thickness of the coating was about 15 mils (380 microns).

For sample C, the same bond coat material was deposited by air plasma spray (APS). The spray system was a robot-controlled METCO 7-MB spray gun. The particle size of the material was in the range of 44–88 microns (−170+325 mesh, U.S. Standard Sieve). The spray conditions were as follows:

Vertical injector arrangement (i.e., injector nozzle entering plasma plume from a vertical position);
Nitrogen: 150 cu ft per hour;
Hydrogen: 10 cu ft per hour;
Carrier gas (nitrogen): 13 cu ft per hour;
Gun current: 500 amp;
Spray distance: 5 in. (12.7 cm);
Feed rate: 6 lb per hour (2.72 kg);
Gun speed: 1400 inches (35.56 m) per minute;

The thickness of the coating was about 13 mils (330 microns).

Sample D employed the same air plasma system used for sample C. The same bond coat composition was used, with a different particle size: 5–37 microns. Spray conditions were as follows:

Vertical injector arrangement;
Nitrogen: 150 cu ft per hour;
Hydrogen: 10 cu ft per hour;
Carrier gas (nitrogen): 13 cu ft per hour;
Gun current: 500 amp;
Spray distance: 5 in. (12.7 cm);
Feed rate: 6 lb (2.72 kg) per hour;
Gun speed: 1400 inches (35.56 m) per minute;

The thickness of the coating was about 15 mils (380 microns).

Figure 2:
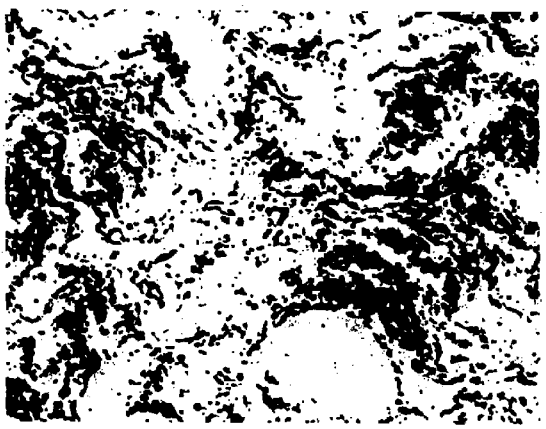
FIG. 2 is a photomicrograph of a cross-section of a metallic bond coat applied on a superalloy substrate, using high velocity oxy-fuel deposition.
Figure 3:
FIG. 3 is a photomicrograph of a cross-section of a metallic bond coat applied on a superalloy substrate, using an air plasma spray technique.
Figure 4:
FIG. 4 is a photomicrograph of a cross-section of another metallic bond coat applied on a superalloy substrate, using an air plasma spray technique.

The microstructure of each coating was examined with an optical microscope, at 1500× magnification. A photomicrograph for each sample was taken as follows:

| Sample A | FIG. 1 |
| Sample B | FIG. 2 |
| Sample C | FIG. 3 |
| Sample D | FIG. 4. |

Based on microstructural analysis for the bond layers, the following measurements were obtained: (1) approximate number of continuous strings of oxide greater than 25 microns in length, per square millimeter of sample; and (2) oxide inclusion level:

TABLE 1

| Sample | # of Oxide Strings | Oxide Inclusion Level |
| --- | --- | --- |
| A* | 40.2 | 2.6% |
| B* | 162 | 18.3% |
| C | 354 | 15.2% |
| D | 628 | 43.7% |

*Comparative examples - outside scope of the present invention.

FIG. 1 clearly depicts a dense bond coating outside the scope of this invention. The microstructure of this vacuum-deposited coating shows no interconnected porosity. The few features that are in view represent areas of closed porosity.

FIG. 2 depicts the microstructure for the bond coating applied by the HVOF technique. Although there is some degree of interconnected porosity, the amount of that type of porosity is not suitable for the present invention.

FIGS. 3 and 4 clearly exhibit the key feature of the present invention, i.e., open networks of interconnected pores. The use of different particle sizes for the bond coat material resulted in different amounts of strings of oxide. The use of a smaller particle size material (sample D; FIG. 4) permitted a larger surface area exposure to oxidation, thereby resulting in a greater oxide inclusion level. In both instances, the degree of interconnected porosity was within the scope of this invention.

Figure 5:
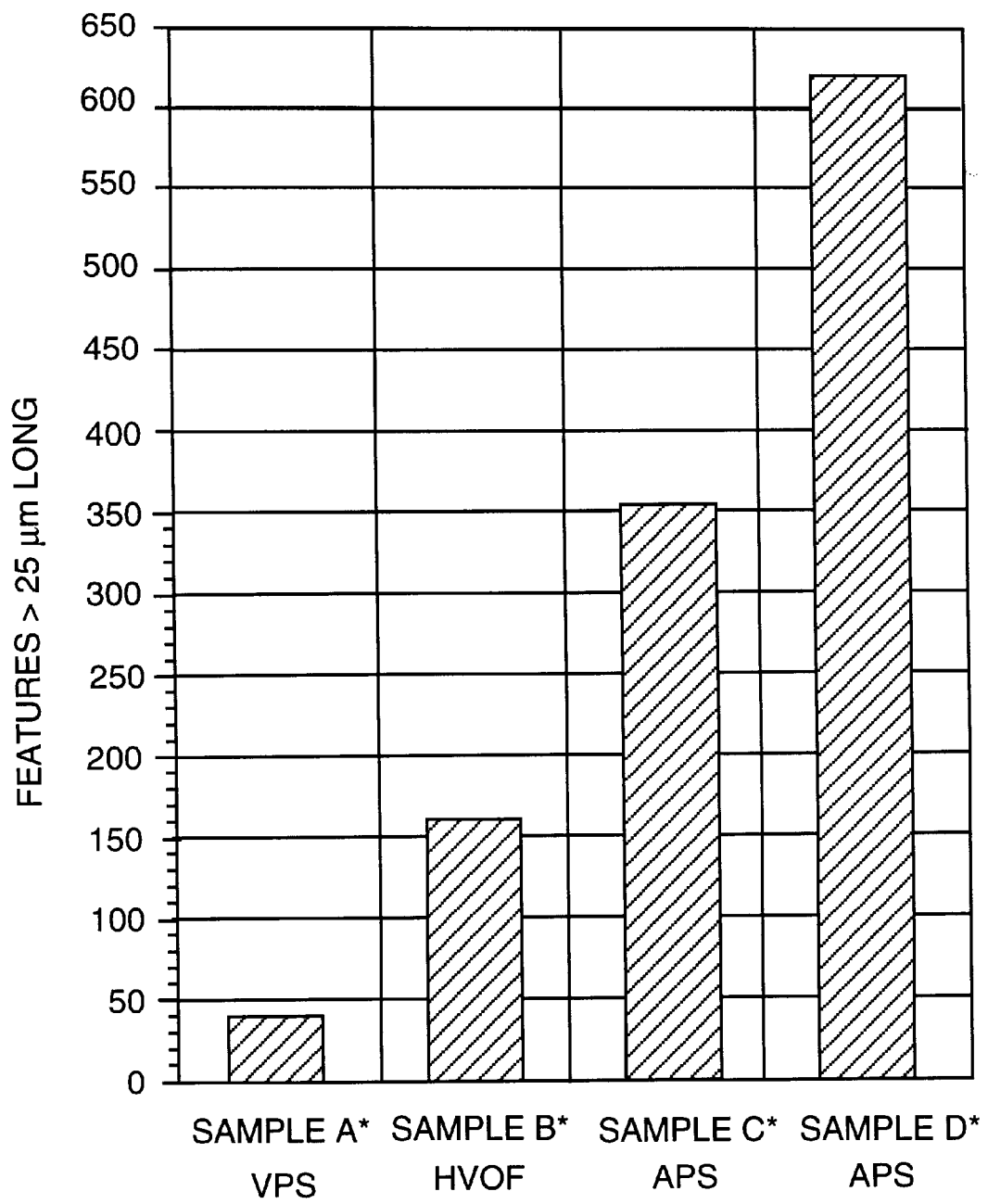
FIG. 5 is a plot representing the density of porosity-based features in a bond coat as a function of the deposition method.

Further examination of samples A–D resulted in quantification of the porosity-based features discussed above. The results are shown in the plot of FIG. 5, wherein the y-axis represents the number of continuous strings of oxide greater than 25 microns in length, per square millimeter of sample. The discrete bars rising from the x-axis represent particular deposition techniques, using the indicated deposition parameters. It should be readily apparent from the plot that the use of the air plasma spray system (samples C and D) resulted in a very large number of the desirable porosity-based features (about 354 and 628 features, respectively, per square millimeter). This is in marked contrast to the microstructures produced using vacuum plasma and HVOF techniques under particular conditions (samples A and B, with about 40 and 162 features, respectively). In fact, when features having closed porosity are excluded from the measurement, the quantity of features for sample A would be zero.

Although sample B exhibited an oxide inclusion level of greater than 10%, the number of oxide features having a length of greater than 25 microns was not high enough to meet the requirements of the present invention.

EXAMPLE 2

In this example, the furnace cycle life of thermal barrier coatings with different bond coat structures was evaluated. For each sample, the substrate was a 1 inch×2 inch (2.54× 5.08 cm) coupon made from a superalloy, as in Example 1, having a thickness of 0.125 inch (0.32 cm). The coupons were grit-blasted with 60 mesh $Al_2O_3$ at 80 psig of air, and ultrasonically cleaned with alcohol.

The bond coat for each sample was an MCrAlY-type material, with M being nickel. The approximate composition of the bond coat was as follows:

Ni: about 65 to 69 wt %

Cr: about 21 to 23 wt %

Al: about 9 to 11 wt %

Y: about 0.8 to 1.2 wt %.

For sample E (outside the scope of this invention), the bond coat was deposited by HVOF, using a METCO DJ2600 HVOF gun. The spray parameters were as follows:

Oxygen: about 400 to 650 scfh

Hydrogen: about 1500 to 1700 scfh

Cooling gas: about 700 to 800 scfh.

The thickness of the coating was about 0.008 inch (203 microns).

For sample F (based on the present invention), the bond coat was formed of the same material as sample E, but was deposited by an air plasma spray system. The particle size of the bond coat material was in the range of 44–88 microns (−170+325 mesh, U.S. Standard Sieve). Spray conditions were as follows:

Nitrogen: 150 cu ft per hour;

Hydrogen: 10 cu ft per hour;

Carrier gas (nitrogen): 13 cu ft per hour;

Gun current: 500 amp;

Spray distance: 5 in. (12.7 cm);

Feed rate: 6 lb (2.72 kg) per hour;

Gun speed: 1400 inches (35.56 m) per minute;

The thickness of the coating was about 0.013 inch (330 microns).

For sample G, based on the present invention, a dense, primary bond layer of the same bond coat material was first deposited on the substrate, using the HVOF technique described in reference to sample E. The thickness of the primary bond layer was about 0.008 inch (203 microns).

Subsequently, an air plasma coating of the same composition (particle size of 44–88 microns (−170+325 mesh)) was applied over the dense layer, using the same parameters used for sample F. This coating had porosity features based on the present invention, i.e., like those of sample F. Its thickness was about 0.004 inch (102 microns).

Thermal barrier coatings having a thickness between about 0.010 inch and 0.020 inch (0.02 cm and 0.05 cm) were then air plasma-sprayed onto each bond coat layer. A commercially-available METCO spray gun (like that described above) was used to deposit the coatings, at a power setting of about 43 kilowatts. The plasma gas system was nitrogen/hydrogen. Carrier gas flow in each instance was 11 scfh. The coatings were post heat-treated after being deposited.

Based on microstructural analysis for the bond layers, the following measurements were obtained: (1) approximate number of continuous strings of oxide greater than 25 microns in length, per square millimeter of sample; and (2) oxide inclusion level:

TABLE 2

| Sample | # of Oxide Strings | Oxide Inclusion Level |
|---|---|---|
| E* | 165 | 9.3% |
| F | | 22.5% |
| G | 710** | 21.0%*** |

*Comparative sample.
**Value for the spongy bond layer, i.e., layer directly under thermal barrier coating.
***Volume % porosity for spongy layer; volume % porosity for underlying dense layer was 6.5%

After being cooled, the samples were subjected to a standard furnace cycle test. Each sample was brought up to 2000° F. (1093° C.), held for 45 minutes, and then quenched. The cycle was continuously repeated, until failure was indicated. In regard to this test, a "failure" is obtained when about 20% coating spallation or interface cracking occurs.

Figure 6:
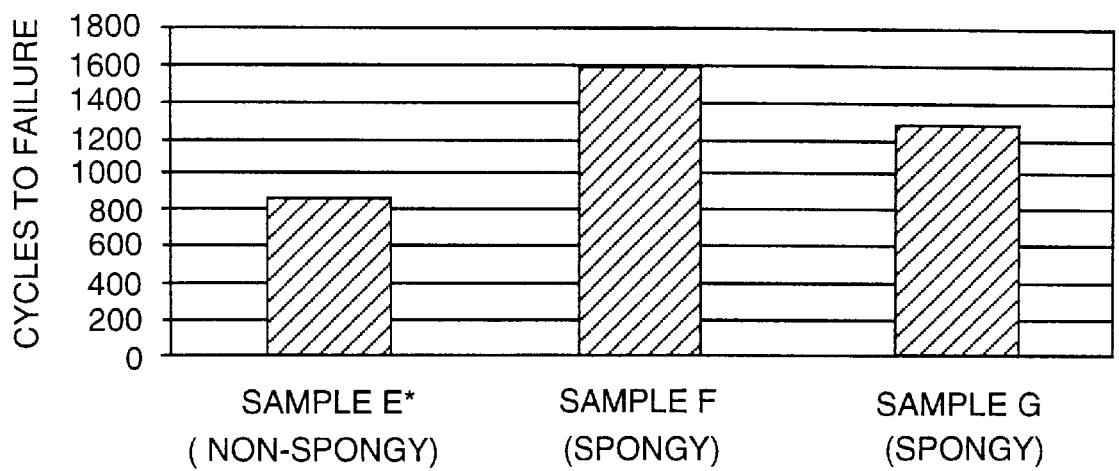
FIG. 6 is a plot representing the furnace cycle life of thermal barrier coatings as a function of the deposition method for the bond coat.

The results are shown in FIG. 6, which displays a plot of furnace cycle failure level as a function of bond layer microstructure. Cycles-to-failure values were as follows:

Sample E: 807 cycles

Sample F: 1608 cycles

Sample G: 1323 cycles.

The data clearly demonstrate superior furnace cycle life when a spongy bond coat is employed.

While preferred embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the claimed inventive concept.

All of the patents, articles, and texts mentioned above are incorporated herein by reference.

What is claimed:

1. A method for providing a protective coating on a metal-based substrate, comprising the following steps:

(a) applying a dense, primary bond layer over the substrate, (b) applying a spongy bond layer over the primary bond layer, wherein the spongy bond layer has a microstructure which comprises an open network of interconnected pores; and then (c) applying a thermal barrier coating over the spongy bond layer.

2. The method of claim 1, wherein the microstructure of the spongy bond layer has at least about 225 continuous strings of oxide greater than 25 microns in length, per square millimeter of sample, viewed in cross-section.

3. The method of claim 1, wherein the spongy bond layer is applied by a thermal spray technique.

4. The method of claim 3, wherein the thermal spray technique is an air plasma spray process.

5. The method of claim 1, wherein the dense, primary bond layer is applied by a vacuum plasma spray technique or by a high velocity oxy-fuel (HVOF) technique.

6. A method for providing a thermal barrier coating on a superalloy substrate, comprising the following steps:
   (a) applying a dense, primary bond layer over the substrate, comprising an alloy of the formula MCrAlY, where M is selected from the group consisting of Fe, Ni, Co, and mixtures of any of the foregoing;
   (b) applying a spongy bond layer over the dense, primary bond layer by air plasma-spraying, wherein the spongy bond layer has a microstructure which comprises an open network of interconnected pores, and further comprises an alloy of the formula MCrAlY, where M is selected from the group consisting of Fe, Ni, Co, and mixtures of any of the foregoing; and then
   (c) applying a zirconia-based thermal barrier coating over the spongy bond layer.

7. The method of claim 6, wherein the dense, primary bond layer is applied over the substrate by a vacuum plasma spray technique (VPS) or by a high velocity oxy-fuel (HVOF) technique.

8. The method of claim 6, wherein the substrate is a turbine engine component.

* * * * *